March 13, 1956 M. A. KNAPP 2,737,743
DISPLAY HOLDER FOR TIRES
Filed March 4, 1954
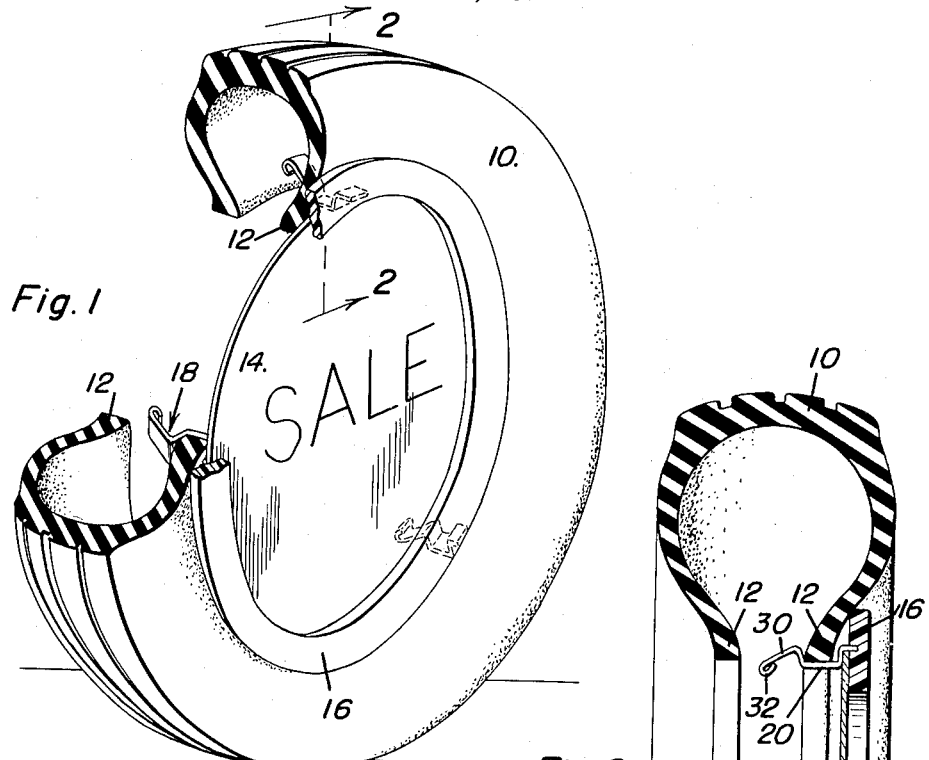
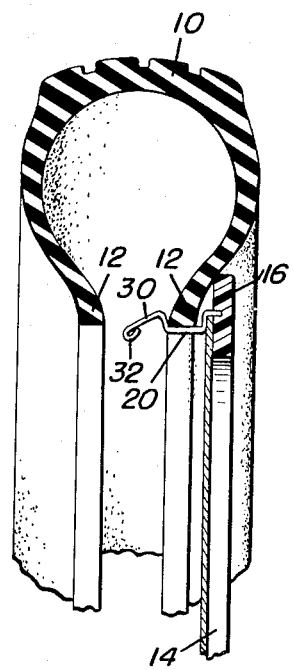
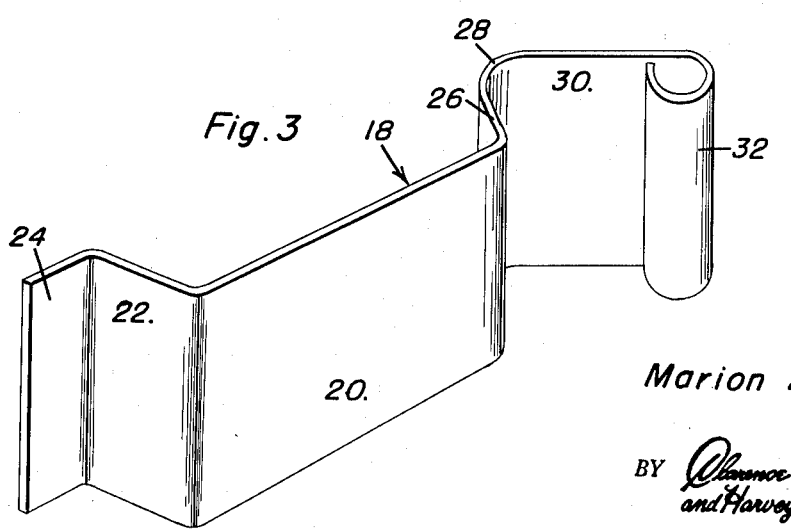
Marion A. Knapp
INVENTOR.

United States Patent Office 2,737,743
Patented Mar. 13, 1956

2,737,743

DISPLAY HOLDER FOR TIRES

Marion A. Knapp, Mansfield, Ohio, assignor to Rico Enterprises, Inc., Mansfield, Ohio, a corporation of Ohio Application March 4, 1954, Serial No. 414,084

2 Claims. (Cl. 40—125)

This invention comprises novel and useful improvements in a display holder for tires, and more specifically pertains to a display holder specifically adapted for use with tires and having an improved fastening means for detachably securing the same to tires in an improved manner.

The objects of this invention are to provide an improved display holder and one which is specifically adapted for use with and to be attached to tires; and which shall include therewith a novel and improved fastener and mounting means whereby the display holder may be detachably secured to tires.

Specific objects of this invention are to provide a display holder which is adapted to be mounted upon the rim of a tire whereby the tire will constitute a frame surrounding the display device; to provide an improved fastener whereby the display device may be releasably secured to a tire by engaging the bead or rim of the same; and wherein the resilient fastener of the device shall cooperate with the tire bead and with the display device in a novel and improved manner.

These, together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view, parts being broken away and shown in section, showing a preferred embodiment of the display device operatively applied to the rim or bead of a tire;

Figure 2 is a vertical transverse sectional view taken substantially upon the plane indicated by the section line 2—2 of Figure 1 and upon a slightly enlarged scale and illustrating the manner in which the display device is attached to the rim of a tire; and Figure 3 is a perspective view of the metal fastener forming a part of the display device for mounting the same upon a tire.

The display device forming the subject of this invention is specifically and peculiarly constructed and adapted for use with a tire as an advertisement or display for the same. It is a prime purpose of this invention to provide such a display device which shall be extremely attractive in appearance, and shall be releasably secured to a tire by engagement with the rim or bead of the same in a manner which will facilitate application of the display device to and its removal from the tire.

In the accompanying drawings the numeral 10 designates generally a tire of any conventional construction, the same being provided with the customary beads or rims 12 whereby the same is adapted to be secured to a wheel in the well known manner. A display device 14 which is to be associated with the tire for various purposes, is illustrated, and the same may conveniently consist of a disc of suitable material and preferably of a diameter slightly greater than that of the rim or bead of the tire, as will be apparent from Figures 1 and 2. In order to releasably and removably secure this display 14 to the tire there is provided the holder 15 which forms the subject matter of this invention.

This holder preferably comprises an open frame annulus or ring 16 of any suitable material, such as a plastic or the like, and preferably of such size and appearance as to fit snugly against the wall of the tire and shield or hide the bead of the same, as illustrated in Figures 1 and 2, and be of an attractive appearance.

The holder includes a plurality of fasteners of a resilient nature is secured to the annulus 16 to serve the dual functions of releasably and resiliently mounting the annulus upon the tire and also to mount and secure the display disc 14 to the annulus. Obviously, any desired number of these fasteners, each indicated generally by the numeral 18 and which is illustrated in Figure 3, may be employed, three such fasteners being deemed to be preferable and being illustrated in Figure 1.

Each fastener is preferably formed of a resilient metallic construction and of any desired material. Each fastener includes a flat plate-like central or web portion 20 which at one extremity is provided with a substantially prependicular flange 22 which, in turn, has a perpendicularly disposed outturned end or flange 24 which is substantially parallel to the web 20 but extends in an opposite direction from the web with respect to the flange 22. At its opposite end the web 20 is provided with a further flange 26 which extends outwardly from the web at an angle slightly greater than a right angle and which has an outwardly curving portion 28 by means of which an inclined portion 30 is integrally carried by the web. The portion 30 is thus disposed, as shown in Figures 2 and 3, at an acute angle to the web and terminates in an inwardly and downwardly turned roll or bead 32.

The flange 24 constitutes a means whereby the fastener is secured to the retainer annulus 16, this flange being preferably imbedded in the annulus, as illustrated in Figure 2, whereby the outside wall of the flange 22 will be parallel to and overlie the adjacent face of the annulus to provide a space therebetween sufficient to snugly receive the edge of the advertising or display disc 14.

That surface of the web 20 which lies between the flanges 22 and 26 is of sufficient length to loosely receive the inner edge of the rim 12 of the tire, while the outer inclined surface of the portion 30 constitutes a camming surface whereby the end of the fasteners may be inserted under the rim or bead and the entire display device then pushed against the tire to the position shown in Figure 2. In this position, the rim will be received within the web and will thus secure the retainer annulus 16 against the tire, while the display device is retained between the fasteners and the retainer annulus.

The fasteners thus resiliently secure the display device to the tire.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A tire display device comprising a holder including a flat sided annulus and resilient fasteners each having one end attached to said annulus, said fasteners each consisting of a U-shaped element for receiving and embracing both sides of the bead of a tire, said element having a web and spaced first and second flanges thereon, said web adapted to engage the inner peripheral surface of a tire bead, said first flange being spaced from and parallel to the flat side of said annulus for retaining a display disc therebetween, said second flange being positioned for location between the beads of a tire.

2. The combination of claim 1 wherein said second flange has a downwardly turned extension constituting a guide surface extending outwardly from said web and inclined downwardly relative to the latter and comprising a camming surface to facilitate the positioning of a tire bead upon the fastener.

References Cited in the file of this patent

UNITED STATES PATENTS

| | | |
|---|---|---|
| 1,843,031 | Kistler | Jan. 26, 1932 |
| 1,943,237 | Harrington | Jan. 9, 1934 |
| 1,986,432 | Harrison | Jan. 1, 1935 |
| 2,077,690 | Harrison | Apr. 20, 1937 |
| 2,177,947 | Riley | Oct. 31, 1939 |
| 2,289,228 | Warner | July 7, 1942 |